UNITED STATES PATENT OFFICE.

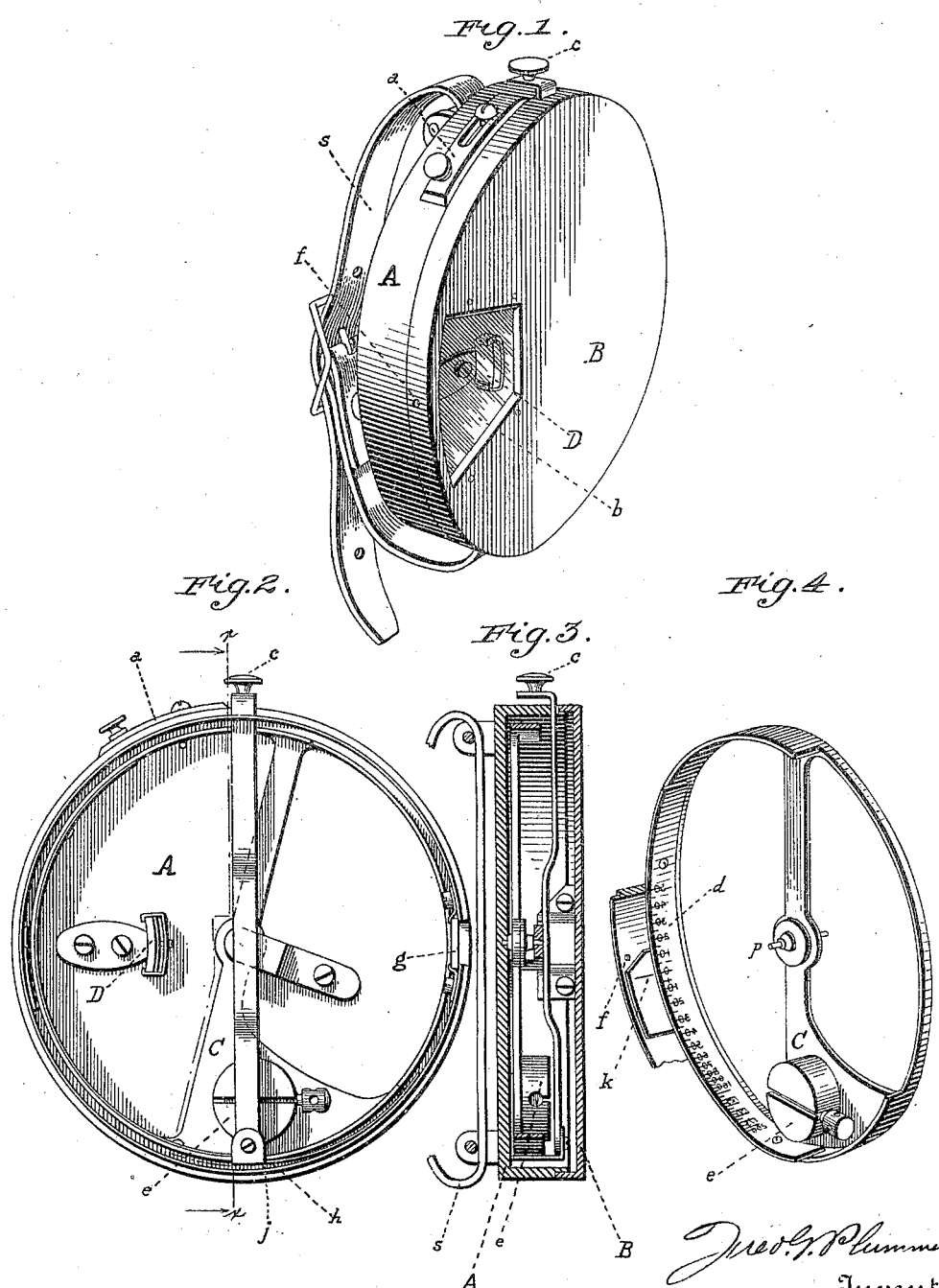

FRED G. PLUMMER, OF WASHINGTON, DISTRICT OF COLUMBIA.

HYPSOMETER.

950,805.          Specification of Letters Patent.          Patented Mar. 1, 1910.

Application filed December 28, 1908. Serial No. 469,531.

(DEDICATED TO THE PUBLIC.)

*To all whom it may concern:*

Be it known that I, FRED G. PLUMMER, a citizen of the United States, residing at Washington, in the District of Columbia, have invented a new and useful Improvement in Hypsometers, and application for a patent of said improvement is made under the act of March 3, 1883, chaper 143; and I do hereby state that the invention described herein, if patented, may be used by the Government or any of its officers or employees in the prosecution of work for the Government or by any other person in the United States without the payment to me of any royalty thereon. The following is a specification thereof.

My invention relates to improvements in hypsometers, the mechanism of which is inclosed in a metal case with windows for the admission of light and vision, and in which a pendulum operates a graduated scale, which, by means of a small interior mirror and the reflection of part of the line of sight thereon, is seen at the same time as the object to be measured.

The objects of my improvements are first, a hypsometer with inclosed mechanism which will allow the instrument to be used in any kind of weather; second, a hypsometer in which the object to be measured and the graduated measuring scale are in the line of sight simultaneously; and third, a hypsometer in which the observed reading on the graduated scale is direct and requires no conversion to other mathematic factors. I attain these objects by the mechanism illustrated in the accompanying drawing in which—

Figure 1 is a general view of the instrument as ready for use; Fig. 2 is a view of the instrument with the top or cover, which contains the larger window, removed; Fig. 3 is a cross section of the instrument; and Fig. 4 a view of the circular pendulum with graduated scale attached.

Similar letters refer to similar parts throughout the several views.

A is the metal body of the instrument to which the mechanical parts are attached.

B is the metal cover which is removable and which contains a window $b$ of transparent xylonite to admit light into the interior of the case.

A and B together constitute the entire instrument which is a flat circular box $3\frac{3}{4}$ inches in diameter and $\frac{3}{8}$ of an inch in thickness.

C is a circular pendulum joined to the body of the instrument by the pivot $p$ and to the interior rim of this pendulum is attached the graduated scale $d$. The circular pendulum C is made to swing upon the pivot $p$ by the force of gravity acting upon the weight $e$. The pendulum is held fast in any position by its contact with the spring $h$, which is attached to the spring clamp $c$ at $j$, and this contact is released by a pressure upon the spring clamp $c$.

$a$ is a sliding lock which when slipped under the spring clamp $c$ prevents its depression and consequently any movement of the pendulum C.

D is a small concave mirror attached to the interior of the body of the instrument and projecting across about half the width of said interior.

When the user of the instrument looks through the sight hole $f$ and out of the small glass window $g$ opposite, the sight is partly intercepted by the concave mirror D and thrown back upon the graduated scale $d$, which being attached to the pendulum C moves forward or backward as the line of vision through the instrument is raised or lowered. By this movement of the pendulum C the divisions upon the graduated scale $d$ move past the guide line $k$ so drawn upon the interior rim of the body of the instrument near the sight hole $f$ as to be visible in the mirror D and so placed with reference to this mirror and to the zero upon the graduated scale $d$ that when the line of vision is horizontal the zero line of the graduated scale $d$ and the guide line $k$ coincide. The figures upon the graduated scale $e$ are engraved in reverse so that they will read correctly when seen reflected in the mirror D.

$s$ is a carrying strap attached to the back of the instrument.

I claim:

1. An apparatus, consisting of a body, a removable cover therefor, a window for the admission of light into the body, a circular pendulum attached to said body by means of a pivot, a graduated scale attached to the interior rim of said pendulum, and a spring brake shoe attached to the interior of the casing and adapted to bear upon said pendulum, a spring clamp attached to said brake shoe for operating said shoe, a sliding lock for locking said shoe in braking position, a sight hole arranged diametrically opposite the window permitting a line of vision through said apparatus and a concave mirror partially intercepting said line of vision, adapted for measuring the height of objects, substantially as specified.

2. An apparatus, consisting of a body, a removable top therefor, a circular pendulum pivoted within said body, a graduated scale attached to the interior rim thereof for indicating the measurement of objects in natural tangents, a pivot for holding said pendulum, a spring brake shoe attached to the interior of the casing and adapted to bear upon said pendulum, a spring clamp attached to said brake shoe for operating said shoe, a sliding lock for locking said shoe in braking position, a sight hole, a window diametrically opposite thereto for establishing a line of vision through said sight hole and window, and a concave mirror within said body for reflecting an image of the said graduated scale into the line of sight, substantially as specified.

FRED G. PLUMMER.

Witnesses:
THOMAS G. SHEARMAN,
MABEL A. BARTON.